United States Patent
Blay

[11] 3,887,613
[45] June 3, 1975

[54] THERMAL PURIFICATION OF TEREPHTHALIC ACID USING GROUP I-B, II-B, VIII CATALYSTS

[75] Inventor: Jorge A. Blay, Corpus Christi, Tex.

[73] Assignee: Celanese Corporation, New York, N.Y.

[22] Filed: July 30, 1971

[21] Appl. No.: 167,857

Related U.S. Application Data

[63] Continuation of Ser. No. 705,616, Feb. 15, 1968, abandoned.

[52] U.S. Cl. ............................... 260/525; 260/525
[51] Int. Cl. ..................... C07c 63/26; C07c 51/42
[58] Field of Search ................................... 260/525

[56] References Cited
UNITED STATES PATENTS
3,171,856  3/1965  Kurtz .................................. 260/525
3,364,256  1/1968  Ichikawa et al. ..................... 260/525
3,452,088  6/1969  Olsen et al. ......................... 260/525
3,456,001  7/1969  Olsen .................................. 260/525

*Primary Examiner*—Lorraine A. Weinberger
*Assistant Examiner*—Richard D. Kelly
*Attorney, Agent, or Firm*—Kenneth A. Genoni; Ralph M. Pritchett; Stewart N. Rice

[57] ABSTRACT

A process for the purification of terephthalic acid (TPA) by heating the TPA and a liquid medium in the presence of a Group I-B, II-B or VIII catalyst to above 325°C followed by cooling of the heated mixture so as to crystallize the purified terephthalic acid. The heating above 325°C is preferably to a temperature such that no TPA remains as a solid.

3 Claims, No Drawings

THERMAL PURIFICATION OF TEREPHTHALIC ACID USING GROUP I-B, II-B, VIII CATALYSTS

This is a continuation of my earlier application Ser. No. 705,616, filed Feb. 15, 1968, and now abandoned.

BACKGROUND OF THE INVENTION

The present invention relates to the purification of terephthalic acid. More particularly, the present invention relates to the purification of terephthalic acid containing such impurities as 4-carboxybenzaldehyde.

Terephthalic acid is presently a very valuable industrial raw material because of its use in the manufacture of polyester synthetic fibers such as poly (ethylene terephthalate). However, commercial production of these polyester fibers has generally not been by the direct esterification of terephthalic acid because of the adverse effects of small amounts of impurities in the terephthalic acid. Instead the terephthalic acid is usually esterified with methanol to form dimethyl terephthalate which in turn is transesterified with the appropriate glycol and polymerized to form the polyester. Heretofore the conversion to dimethyl terephthalate has been considered necessary in order to eliminate the impurities in the terephthalic acid but it is readily apparent that it would be desirable to form the polyester directly from the terephthalic acid in order to eliminate the expensive and time consuming esterification distillation and transesterification necessary when utilizing dimethylterephthalate.

The adverse impurities in terephthalic acid are those arising during the course of its manufacture and therefore the particular impurities present may vary according to the process of manufacture. At the present time there are several methods for producing terephthalic acid such as the oxidation of alkylbenzenes. These oxidations of alkylbenzenes may be conducted for example by oxidizing p-xylene in the liquid phase with 30 to 40% nitric acid at about 200°C, either with or without added air or oxygen. Another method for the oxidation of p-xylene is with an oxygen-containing gas (such as air) at temperatures around 150°C and in the presence of a heavy metal catalyst such as cobalt acetate or other Group VIII metal salts. This latter method is disclosed in U.S. Pat. Nos. 3,240,803, 3,171,856, 3,139,452, 3,119,860, 3,064,044, 3,044,066 and British Patent No. 1,004,895. An alternative method for preparing terephthalic acid by the oxidation of alkylbenzenes is disclosed in U.S. Pat. No. 2,746,990 wherein diisopropyl benzene is oxidized to terephthalic acid. The methods for producing terephthalic acid are not however limited to the oxidation of alkylbenzenes and U.S. Pat. Nos. 3,243,457 and 3,096,366 disclose the production of terephthalic acid by the rearrangement of potassium salts of benzoic or phthalic acids. Such rearrangements are generally known as Henkel rearrangements. Regardless of the method of manufacture, the terephthalic acid will generally contain various impurities which are detrimental to polyester production, especially from the standpoint of color. The terephthalic acid produced by the processes now well known will generally have less than about 5% by weight of impurities in it. Although all of the troublesome impurities have not been identified, some of the more common impurities are 4-carboxybenzaldehyde, p-toluic acid, o-phthalic acid, m-phthalic acid, and p-acetylbenzoic acid. Of these impurities, 4-carboxybenzaldehyde is generally the most troublesome impurity and the amount has been used extensively as a criterion of effectiveness in purification processes. Of course the specifications for a fiber grade terephthalic acid vary according to the type of polymerization process to be used in forming the polyester and according to the process of manufacturing the terephthalic acid, but the specifications for fiber grade terephthalic acid generally require less than about 50 parts per million 4-carboxybenzaldehyde. In view of the stringent purity requirements the term "crude" terephthalic acid as used herein is not meant to cover only terephthalic acid having large amounts of impurities but is also meant to include terephthalic acid having extremely small but undesirable amounts of impurities. For example, terephthalic acid containing at least 40 parts per million of 4-carboxybenzaldehyde might be too impure for some end uses and thus could be considered crude terephthalic acid as far as the present invention is concerned. Crude terephthalic acid as used herein is also intended to cover and include terephthalic acid which may or may not have been subjected to other types of purification processes so as to partially purify the terephthalic acid.

Various processes have been devised to treat terephthalic acid for the removal of organic impurities and other impurities contributing to the quality and color of polyesters. Some of these processes include activated charcoal treatment of solutions of water soluble salts, alkaline oxidations with hypohalite or permanganate solutions of water soluble salts, water leaching, and treatment of aqueous solutions of alkaline salts with carbon monoxide. It has also been disclosed in such patents as U.S. Pat. No. 2,923,736 that crude terephthalic acid may be purified by sublimation followed by fractional condensation of the terephthalic acid from the resulting gas.

It is also disclosed in copending U.S. Pat. application Ser. No. 780,268, filed Nov. 29, 1968, and now issued as U.S. Pat. No. 3,717,674, that crude terephthalic acid may be purified by heating it in an inert, liquid medium to a temperature above 325°C followed by crystallization of the terephthalic acid from solution.

SUMMARY

It is thus an object of the present invention to provide a process for the purification of impure terephthalic acid. It is a further object of the present invention to provide a process for the purification of crude terephthalic acid so as to produce a terephthalic acid suitable for fiber forming. Another object of the present invention is to provide a process for the reduction of impurities such as 4-carboxybenzaldehyde in an impure terephthalic acid. Additional objects will become apparent from the following description of the present invention.

These and other objects are accomplished by the present invention which in one of its embodiments is a method for improving the purity of a crude terephthalic acid comprising (1) heating crude terephthalic acid in the presence of an inert liquid medium and a soluble catalyst which will provide a metal from Groups I-B, II-B or VIII of Mendelyeev's Periodic Table to a temperature of at least 325°C, said temperature being one at which no more than about 50% of the terephthalic acid remains as a solid, the pressure being sufficient to maintain a liquid phase at temperatures below the critical temperature, (2) cooling the terephthalic acid and liquid medium so as to crystallize terephthalic acid and (3) recovering the thus crystallized, purified terephthalic acid. By the term "pressure being sufficient to maintain a liquid phase at temperatures below the critical temperature" is meant that if the required heating above 325°C does not exceed the critical temperature of the liquid phase present, then the pressure must be sufficient to maintain this liquid phase. Likewise, if the critical temperature is exceeded, then the pressure must be at least that which would cause a liquid phase to exist if the temperature were lowered to the critical temperature. Although applicant does not wish to be bound by any particular theory, it appears that many of the undesirable impurities, and in particular the 4-carboxybenzaldehyde impurities, are being selectively destroyed or decomposed during the heating step of the present invention, and it has been found that the presence of certain metal catalysts enhance this decomposition. The products of the decomposition either remain in the mother liquor during recrystallization or remain in the TPA as impurities which are not especially harmful or undesirable.

DESCRIPTION OF THE PREFERRED EMBODIMENTS

As may be seen from the above, the present invention calls for heating crude terephthalic acid at temperatures above 325°C such that no more than 50% of the crude acid remains as a solid although it is preferred that the heating be to a temperature such that none of the terephthalic acid remains as a solid. Since the heating step of the present invention is also limited to pressures sufficient to maintain a liquid phase at temperatures less than the critical temperature of the liquid phase, this means that at least 50% (and preferably 100%) of the terephthalic acid must be in the liquid phase (or in a gas phase which is at equilibrium with the liquid phase) if the critical temperature is not exceeded during the heating step. Whether this liquid phase which is present in some embodiments of the present invention is a solution of terephthalic acid in the inert liquid medium, is a solution of the inert liquid medium in the terephtalic acid or is merely a eutectic mixture of the two is not always clear. In some cases such as when the terephthalic acid is present in only very small percentages, it appears that the terephthalic acid does actually go into solution in the liquid medium. However, when treating a mixture containing for example 85% terephthalic acid and 15% liquid medium such as might be present in a wet filter cake, it is not exactly clear what the liquid phase should be called. As pointed out above when operating the present invention such that a liquid phase is present, there might or might not be a gas phase in equilibrium with the liquid phase depending on the method used for heating. For example, if one started heating a liquid-solid slurry at autogenous pressure in a closed container which was completely filled with the liquid-solid slurry, one should have only a single liquid phase present or a liquid-solid two phase system present unless the critical temperature of the liquid phase was exceeded. However, assuming the pressure is that required in the present process, if a liquid-solid slurry were heated at autogenous pressure in a closed container wherein initially a gas phase was present, a gas phase should remain in equilibrium with the liquid phase until the critical temperature was reached at which time the interface between the gas phase and the liquid phase would disappear.

The pressure limitation called for in the present process also means that if the critical temperature is exceeded, then at least about 50% (and preferably 100%) of the terephthalic acid and the inert liquid medium must exist as a single plasma-like phase. The term "plasma-like phase" is used in describing the physical state of a material which has been heated above the critical temperature since the material does not really seem to behave like a true gas but instead seems to have properties of both a liquid and a gas.

The actual final physical state of the material being heated and its physical state during the heating will of course vary according to the amount of terephthalic acid initially present, the liquid medium being used, and the final temperature reached during heating. Thus in heating a slurry of crude terephthalic acid and liquid medium in accordance with the present invention, all of the acid might go into solution in the liquid medium before 325°C is reached, in which case one would continue heating the solution to a final treatment temperature of at least 325°C or higher, which final treatment temperature might or might not be above the critical temperature of the liquid phase. At this point the applicant would like to point out that the treatment temperatures actually used in the present invention should generally be within the range of about 325° to 425°C. The heating period required for the process of the present invention, i.e. the length of time the temperature must be held at the required temperature of 325°C or above, may vary widely and will depend on the particular temperature being utilized, the amount of impurities present, the degree of purification desired, etc. For a given treatment temperature the reduction of impurities increases with time; likewise, for a given length of time the reduction of impurities will increase as the temperature is increased. Although an increase in the time of heating above 325°C will result in a greater reduction of impurities, it has also been found that some terephthalic acid will decompose at these high temperatures. Therefore to avoid excessive losses of terephthalic acid by decomposition the heating period should generally be less than about two hours, for example from 10 seconds to 2 hours and is preferably from about 30 seconds to 30 minutes at temperatures of from 340°C to 410°C.

Going back to the various things that might take place when treating a mixture of crude terephthalic acid and liquid medium in accordance with the present invention, one might find upon reaching 325°C that more than 50% of the crude terephthalic acid remained as a solid so that the temperature must necessarily be raised above 325°C until at least 50% of the crude acid solid does disappear. Usually as one heats the mixture all of the solid acid will disappear while there is still a liquid phase present, in other words before the critical temperature is reached. However, some observations have been made wherein it appeared that as the temperature of a mixture was increased, more and more of the solid terephthalic acid went into solution in the liquid medium (or formed a eutectic mixture or the like) but that the critical temperature of the liquid phase present was reached before all of the solid phase had disappeared. Thus a solid phase was present together with a plasma-like phase. When heating was continued the remaining solid gradually disappeared such that only a plasma-like phase was present. As those skilled in the art are well aware, it is extremely difficult to make observations at the critical point and at the temperatures involved in the present invention; therefore applicant does not wish to be bound by the foregoing observations.

The actual pressures developed in the heating step of the present invention are relatively high since they must be at least that pressure which will maintain a liquid phase at temperatures below the critical. These pressures will of course vary according to the amount of liquid medium present, the particular liquid medium being used, the final temperature of heating and the like. It might generally be stated that the pressure during the heating step will be above 100 psig. The process of the present invention is most conveniently operated at autogenous pressure, the volume of the system used for heating the desired volume of terephthalic acid in liquid medium being of course small enough that sufficient pressures are developed. If higher pressures are desired, nitrogen or other gases such as $CO_2$ may be added in order to maintain the desired pressure.

As was pointed out above the thermal treatment or terephthalic acid in a liquid medium is disclosed and claimed in copending application Ser. No. 780,268, however, it has now been found that the presence of a compound, complex, salt, acetylacetonate, etc. which will provide a metal from Groups I-B, II-B, or VIII of Mendelyeev's Periodic Table serves as a catalyst. Groups I-B, II-B and VIII include the metals iron, cobalt, nickel, ruthenium, rhodium, palladium, osmium, irridium, platinum, copper, silver, gold, zinc, cadmium, and mercury. The metal may be employed as a soluble organic or inorganic compound, salt or chelate which is compatible with the reaction conditions. It is preferred to use metal chelates, metal salts of organic carboxylic acids, e.g. $C_2$ to $C_{12}$ acids, or inorganic salts such as phosphates, bromides, sulfates and chromates. A catalyst of one metal may be mixed with one or more of the other metals. Also the metal catalyst of the present invention may be mixed with such catalysts as the alkali metal catalysts disclosed in aforementioned copending application Ser. No. 780,268. Of the Group I-B, II-B and VIII metals, iron, palladium, and cobalt are preferred. Some specific compounds which may be used includes cobalt acetate, cobalt bromide, cobalt acetylacetonate, cobalt naphthenate, cobalt terephthalate, cobalt propionate, cobalt benzoate, cobalt toluate, cobalt acetyl benzoate, cobalt phosphate, silver acetate, silver cyclohexane butyrate, silver citrate, copper acetylacetonate, cupric potassium chloride, cupric chloride, palladium acetate, $PdCl_2.2H_2O$, palladium butyrate, palladium acetylacetonate, chloroplatinic acid, platinum tetrachloride, platinum acetylacetonate, ferric acetate, nickel acetate, nickel ammonium sulfate, ferrous oxalate, ferric chloride, nickel acetylacetonate, ruthenium naphthenate, mercuric acetate, mercuric chloride, auric chloride, rhodium acetylacetonate, rhodium trichloride, auric cyanide, iridium propionate, iridium trichloride trihydrate, cadmium cyclohexane butyrate, $3 CdSO_4.8H_2O$, cadmium propionate, osmium tetraoxide, osmium trichloride, trihydrate, zinc iodide, zinc chloride, zinc acetylacetonate, ruthenium trichloride hydrate. The catalyst should generally be present in amounts so as to provide from about 100 ppm to 6% weight percent of the metal based on the combined weight of the crude terephthalic acid and liquid medium, preferably in amounts of from 0.1% to 2%. The ranges are for the amount of the metal itself, e.g. cobalt, and not for the amount of a compound such as cobalt acetate which is used to provide the cobalt.

The process of the present invention may be carried out batchwise or in a continuous system and may be conducted in various types of equipment of various materials of construction, e.g. glass, stainless steel of titanium alloys. The crystallization called for in the present invention may be effected for example by merely cooling the solution such as in a tank crystallizer or may be effected in various other types of equipment such as crystallizing evaporators or vacuum crystallizers. The cooling during crystallization should generally be at least below 200°C and is preferably below 100°C in order to insure optimum recovery of the terephthalic acid. Since terephthalic acid is generally quite insoluble at ordinary temperatures in most liquids, the mixture of crude terephthalic acid in liquid medium to be treated by this process will generally be in the form of a slurry or other mixture wherein the terephthalic acid is present as a solid. The slurries or other mixtures can be formed such as by adding crude terephthalic acid crystals to the liquid medium or they can be the effluent of processes wherein the crude terephthalic acid is already mixed with the liquid medium. For example the aforementioned U.S. Pat. No. 3,240,803 discloses a process for the production of terephthalic acid wherein p-xylene is oxidized with oxygen in the presence of a cobalt acetate catalyst and an acetic acid solvent such that the effluent of the reaction zone comprises a crude terephthalic acid slurried in a liquid medium of acetic acid and small amounts of water. Since this slurry also contains the cobalt catalyst used in the oxidation reaction it can be treated in accordance with the present invention without adding additional cobalt catalyst and without the necessity of first separating the crude terephthalic acid from the liquid medium and then reslurrying the crude terephthalic acid. The process of the present invention can also be applied to mixtures of terephthalic acid and liquid medium which have been preheated and are already at a temperature such that the terephthalic acid is in solution in the liquid medium. Also the process of the present invention may be operated such as by preheating the liquid medium alone to temperatures below or above 325°C and then combining it with the crude terephthalic acid. In the process of the present invention, the crude terephthalic acid should be generally present in amounts of from about 3 to 95% based on the combined weight of the liquid medium and the crude terephthalic acid, preferably about 5 to 50% by weight.

The inert, liquid medium to be used in the present invention should be one which has a boiling point above 20°C and a melting point below 200°C and can be water, organic compounds or mixtures of organic compounds and water. Water alone is the least preferred medium so that it might be stated that the inert, liquid medium will be usually comprised of an organic compound (i.e. organic compounds alone or combined with water). By "inert" is meant that the liquid medium is one which does not react with the terephthalic acid to any appreciable extent under the conditions of the process and one which is not destroyed to any appreciable extent under the conditions of the process such as by reacting with itself, polymerizing, etc. Preferably the inert, liquid medium is comprised of from about 0 to 75% by weight of water and 25 to 100% by weight of a member selected from the group consisting of $C_5+$ hydrocarbons, $C_2+$ halohydrocarbons, carboxylic acids, hydrocarbon ethers, halohydrocarbon ethers, and mixtures thereof. By "$C_5+$ hydrocarbons" is meant those having five or more carbon atoms while "$C_2+$ halohydrocarbons" is intended to cover those having two or more carbon atoms. Of the hydrocarbons and halohydrocarbons that may be used, aromatics are preferred. Examples of suitable hydrocarbons, aromatic ethers, and halohydrocarbons include naphthalene, tetralin, diphenyl, xylene, benzene, dicyclopentadiene, cumene, n-hexane, cyclohexane, 2-methyl-heptane, the dodecanes, bibenzyl, chloro-toluene, diphenyl ether, ethylene glycol ether, chlorinated biphenyls, chlorinated naphthalenes, polyphenylene oxides, polyoxyethylenediols, chlorinated diphenyl ethers, $C_{10}$ aromatic isomers, and the like. Of the carboxylic acids, the lower ($C_1$ to $C_7$) aliphatic carboxylic acids such as acetic, butyric, and propionic are preferred with acetic being preferred over the others. Other carboxylic acids which may be used include benzoic acid, phenyl acetic chlorobenzoic acid, and chloroacetic acid. The preferred liquid medium for use in the present invention is one consisting essentially of from 85 to 100% by weight of a $C_2$-$C_4$ aliphatic carboxylic acid and from 0 to 15% by weight of water or the especially preferred medium comprised of a mixture of xylene and a carboxylic acid disclosed and claimed in copending application Ser. No. 705,601 filed Feb. 15, 1968.

The crude terephthalic acid to be treated according to the present invention may be derived from various sources and may be terephthalic acid which has been subjected to previous types of purification treatment. In general, the present invention is most useful in the purification of crude terephthalic acid derived from the oxidation of alkylbenzenes or from the rearrangement of inorganic salts of benzene carboxylic acids, however, best results are obtained when treating impure or crude terephthalic acid derived from the oxidation of p-xylene with an oxygen-containing gas in the presence of a heavy metal catalyst. Whatever the source of the terephthalic acid, it can be stated that the present invention is useful in treating crude terephthalic acid containing 4-carboxybenzaldehyde, p-toluic acid, o-phthalic acid, m-phthalic acid, and p-acetylbenzoic acid or mixtures thereof although it is most useful in removing 4-carboxybenzaldehyde impurities. As was pointed out above, terephthalic acid produced by the present well known processes will generally have less than about 5% by weight of impurities and quite frequently less than 1% by weight impurities. It should be kept in mind that the thermal treatment step of the present invention does not remove or decompose all types of impurities, e.g. metal impurities, which may be found in a crude terephthalic acid, and thus the present process may be combined with other purification treatments such as simple recrystallizations. For example, when treating a mixture of 85% crude acid and 15% liquid medium in accordance with the present invention, it may be desirable to add additional liquid medium after the thermal treatment step and before the terephthalic acid is crystallized so that the crystallization will be from a more dilute solution and thus remove more of the impurities that are amenable to separation from the acid by crystallization from a solution. Instead of adding the liquid medium after the thermal treatment, the acid could first be crystallized, recovered, then redissolved and recrystallized from a solvent.

In order to illustrate specific embodiments of the present invention, the following example is presented.

EXAMPLE

Several runs are made in which crude terephthalic acid containing about 0.4% by weight (4000 ppm) of 4-carboxybenzaldehyde impurity is added to different liquid mediums. Also added were various catalysts. About one-half milliliter of the mixture of terephthalic acid, catalyst and liquid medium is then charged to a small glass tube of about 1 milliliter volume and the glass tube sealed. The glass tube is then quickly heated to the desired temperature for the desired period of time and then cooled so as to crystallize the terephthalic acid from liquid solution or in the presence of a liquid phase. The conditions and the results of these runs may be seen in the following table. In the table, TPA stands for terephthalic acid. HOAc stands for acetic acid, and CBA stands for 4-carboxybenzaldehyde in the product. All percentages and ratios are on a weight basis. All catalysts were added as the acetate except the zinc which was added as zinc chloride, the iron as $Fe(OH)(C_2H_3O_2)_2$, the rhodium as $RhCl_3.H_2O$, the iridium as $IrCl_4$ and the combined sodium and osmium as $Na_2O_xO_4$.

TABLE

| Run No. | Temp., °C | Time, min. | Liquid medium | TPA[a] % | Catalyst % metal | CBA |
|---|---|---|---|---|---|---|
| 1 | 375 | 5 | 95% AcOH 5% $H_2O$ | 20 | Co-0.75 | 9 |
| 2 | 350 | 5 | do | 15 | Fe-0.25 | 206 |
| 3 | 380 | 5 | do | 15 | Co-0.25 | <5 |
| 4 | 360 | 15 | do | 15 | Co-0.24 Fe-0.02 | 24 |
| 5 | 360 | 15 | do | 15 | Co-0.24 | 27 |
| 6 | 350 | 10 | do | 15 | Pd-0.24 | <5 |
| 7 | 350 | 5 | do | 20 | Zn-0.25 | 375 |
| 8 | 350 | 5 | do | 15 | Ag-0.25 | 217 |
| 9 | 350 | 7 | 95% AcOH 5% $H_2O$ | 20 | Cu-0.25 | 330 |
| 10 | 410 | 10 | do | 50 | Fe-0.25 | <5 |
| 11 | 350 | 5 | do | 15 | Co-0.25 Na-1.00 | 50 |
| 12 | 350 | 5 | do | 20 | Ni-0.24 | 300 |
| 13 | 350 | 5 | do | 15 | Os-0.05 Na-0.01 | 240 |
| 14 | 350 | 5 | do | 15 | Ir-0.05 | <5 |
| 15 | 350 | 5 | do | 15 | Rh-0.05 | 200 |
| 16 | 410 | 5 | AcOH | 75 | Co-0.03 | 30 |
| 17 | 380 | 5 | 95% propionic | 15 | Co-0.25 | 17 |

TABLE – Continued

| Run No. | Temp., °C | Time, min. | Liquid medium | TPA[a] % | Catalyst % metal | CBA |
|---|---|---|---|---|---|---|
| 18 | 380 | 5 | 5% $H_2O$ boric acid | 15 | Co-0.10 | 629 |
| 19 | 380 | 10 | 90% xylene 10% AcOH | 15 | Ni-0.10 | 45 |
| 20 | 360 | 10 | 50% AcOH 50% $H_2O$ | 15 | Co-0.25 | 900 |
| 21 | 380 | 10 | p-xylene | 20 | Co-0.01 | 200 |
| 22[b] | 360 | 15 | 90% AcOH 10% $H_2O$ | 15 | Co-0.22 | 84 |

[a]Based on combined weight of TPA and liquid medium.
[b]Effluent from reactor wherein p-xylene oxidized to TPA using cobalt acetate catalyst.

In order to prevent corrosion in metal vessels such as those constructed of stainless steel, a soluble phosphorus compound is preferably present in the process. A very wide variety of phosphorus compounds may be used but generally speaking the phosphorus compounds which are desirably present have a phosphorus atom linked to at least one oxygen or sulfur atom, preferably oxygen. This includes the addition of compounds to the process which already have a phosphorus-oxygen or phosphorus-sulfur linkage (such as orthophosphoric acid, triethyl phosphine oxide and phosphorus pentasulfide) or those which will form under the conditions of the process a compound or ion containing such a linkage. Some types of compounds which are desirable include the oxyacids of phosphorus, metal salts of the oxyacids of phosphorus, esters of the oxyacids of phosphorus, oxides of phosphorus and sulfides of phosphorus. Examples of the foregoing include orthophosphoric acid, pyrophosphoric acid, phosphoranceioic acid, orthophosphorus acid, hypophosphorus acid, monopotassium phosphate, trisodium phosphate, sodium acid orthophosphite, dipotassium pyrophosphite, tri-n-butyl phosphite, dimethyl methylphosphonate, triethyl phosphate, tricresyl phosphate, propyl phosphoric acid, ethyl diethylphosphinite, diethyl phosphinite, diethylphosphinic acid, ethyl phosphonic acid, ethyl diethylphosphinate, triethyl phosphine oxide, phosphorus trioxide, phosphorus pentoxide, phosphorus tetrasulfide, and the like. When a metal salt of a phosphorus acid, such as $Co_3(PO_4)_2$, is used as the source of the phosphorus, such a salt will also serve as the source of metal which acts as a catalyst as pointed out above. Extremely wide amounts of a phosphorus compound may be utilized in the present invention, for example from amounts of about 1 ppm to amounts of 50,000 ppm based on the combined weight of the crude terephthalic acid and liquid medium.

I claim:

1. A method for improving the purity of a crude terephthalic acid containing 4-carboxybenzaldehyde as an impurity, which process consists essentially of 1. heating said crude terephthalic acid and an inert liquid medium consisting essentially of from about 0 – 75% by weight of water and from about 25 – 100% by weight of an inert organic compound selected from the group consisting of $C_5$ + hydrocarbons, $C_2$ + halohydrocarbons, carboxylic acids, hydrocarbon ethers, halohydrocarbon ethers, and mixtures thereof, and a soluble catalyst which will provide a metal selected from Group I-B, or II-B of Mendelyeev's Periodic Table to a temperature of at least 325°C, said temperature being one at which no more than about 50% of the terephthalic acid remains as a solid, the pressure being sufficient to maintain a liquid phase at temperatures below the critical temperature, said catalyst being present in an amount sufficient to provide from about 100 ppm to 6% by weight of terephthalic acid and liquid medium, 2. cooling the terephthalic acid and liquid medium so as to crystallize terephthalic acid and 3. recovering the thus crystallized, purified terephthalic acid.

2. A method for improving the purity of a crude terephthalic acid containing 4-carboxybenzaldehyde as an impurity, which process comprises:

1. heating said crude terephthalic acid and an inert liquid medium consisting essentially of from about 0–75% by weight of water and from 25–100% by weight of an inert organic compound selected from the group consisting of $C_5$ + hydrocarbons, $C_2$ + hydrocarbons, carboxylic acids, hydrocarbon ethers, halohydrocarbon ethers, and mixtures thereof in the presence of (a) a salt of an alkali metal and (b) a soluble catalyst which will provide a metal selected from Group I-B, II-B, or VIII of Mendelyeev's Periodic Table to a temperature of at least 325°C, said temperature being one at which no more than about 50% of the terephthalic acid remains as a solid, the pressure being sufficient to maintain a liquid phase at a temperature below the critical temperature, said catalyst being present in an amount sufficient to provide from about 100 ppm to 6% by weight of metal based on the combined weight of terephthalic acid and liquid medium;

2. cooling the terephthalic acid and liquid medium to crystallize terephthalic acid, and 3. recovering the thus crystallized, purified terephthalic acid.

3. A method for improving the purity of a crude terephthalic acid containing 4-carboxybenzaldehyde as an impurity, which process comprises:

1. heating said crude terephthalic acid and an inert liquid medium consisting essentially of from about 0–75% by weight of water and from 25–100% by weight of an inert organic compound selected from the group consisting of $C_5$ + hydrocarbons, $C_2$ + halohydrocarbons, carboxylic acids, hydrocarbon ethers, halohydrocarbon ethers, and mixtures thereof, in the presence of a soluble cobalt catalyst, to a temperature of at least 325°C, said temperature being one at which no more than about 50% of the terephthalic acid remains as a solid, the pressure being sufficient to maintain a liquid phase at a temperature below the critical temperature, said catalyst being present in an amount sufficient to provide from about 100 ppm to 6% by weight of metal based on the combined weight of terephthalic acid and liquid medium;

2. cooling the terephthalic acid and liquid medium to crystallize terephthalic acid, and
3. recovering the thus crystallized, purified terephthalic acid.

* * * * *